United States Patent [19]

Johnson et al.

[11] Patent Number: 4,955,725
[45] Date of Patent: Sep. 11, 1990

[54] LASER OSCILLATOR/AMPLIFIER WITH COMPENSATION FOR STRESS BIREFRINGENCE

[75] Inventors: Bertram C. Johnson, Sunnyvale; Richard L. Herbst, Palo Alto, both of Calif.

[73] Assignee: Spectra Physics, San Jose, Calif.

[21] Appl. No.: 358,714

[22] Filed: May 26, 1989

Related U.S. Application Data

[63] Continuation-in-part of Ser. No. 312,734, Feb. 17, 1989, abandoned.

[51] Int. Cl.$^5$ .............................................. H01S 3/10
[52] U.S. Cl. ...................................... 372/22; 372/25; 372/26; 372/27; 372/33; 372/10; 372/105; 372/106; 372/108; 307/425; 307/429
[58] Field of Search ................... 372/33, 25, 26, 27, 372/9, 10, 22, 29, 92, 108, 105, 106; 307/425–429

[56] References Cited

U.S. PATENT DOCUMENTS 4,360,925 11/1982 Brosnan et al. .................... 372/108
4,752,931 6/1988 Dutcher et al. ...................... 372/10

FOREIGN PATENT DOCUMENTS 8603066 5/1986 World Int. Prop. O. .......... 372/105

OTHER PUBLICATIONS

Robert Pixton, "Tripling yag frequency", Laser Focus, Jul. 1978, pp. 66–70.
Heritier et al., "Thermal Effects in High Power Q-Switched Lasers", SPIE OE-LASE Conference, Jan. 1988.
Scott et al., "Birefringence Compensation and TEM$_{00}$ Mode Enhancement in a Nd:YAG Laser", Applied Physics Letters, vol. 18, No. 1, Jan. 1, 1971, pp. 3–4.
"DCR-3 and DCR-4 Pulsed Nd:YAG Lasers", Spectra-Physics Product Brochure, Nov. 1988.

Primary Examiner—William L. Sikes
Assistant Examiner—Georgia Y. Epps
Attorney, Agent, or Firm—Fliesler, Dubb, Meyer & Lovejoy

[57] ABSTRACT

A laser oscillator/amplifier system in which thermally induced birefringence in the gain media of the oscillator is compensated by thermally induced birefringence in the gain media of the amplifier. The system produces a quality output beam efficiently and with high power density in the preferred polarization. The oscillator cavity is characterized by a high reflector at one end and an output coupler at the second end with an oscillator gain medium exhibiting thermally induced birefringence in between. An amplifier exhibiting thermally induced birefringence which matches the thermally induced birefringence in the oscillator gain medium is mounted to receive the output of the oscillator cavity. A ninety degree rotator is mounted between the oscillator gain medium and the amplifier so that compensation for thermally induced birefringence in the oscillator gain medium is compensated by the matching thermally induced birefringence in the amplifier. The ninety degree rotator may be mounted inside the oscillator cavity, that is, between the oscillator gain medium and the output coupler; or it may be mounted outside of the oscillator cavity, that is, between the output coupler and the amplifier.

23 Claims, 3 Drawing Sheets

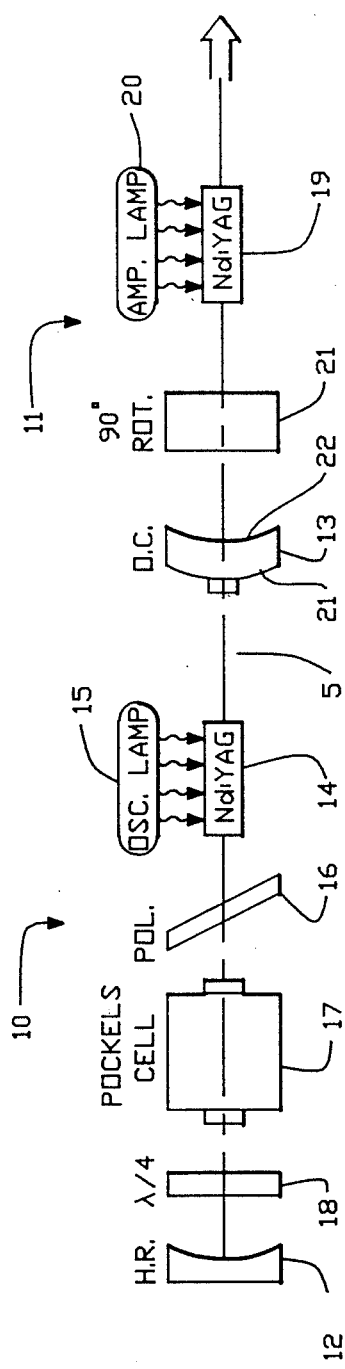
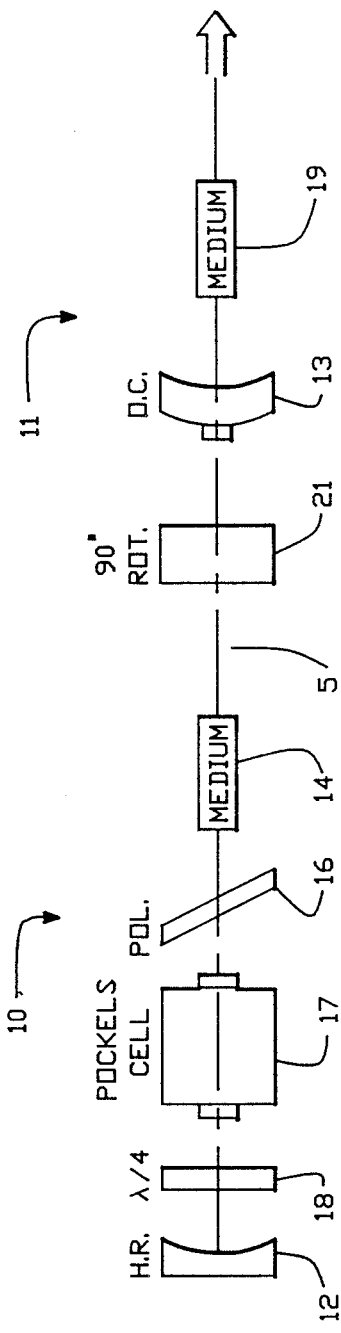

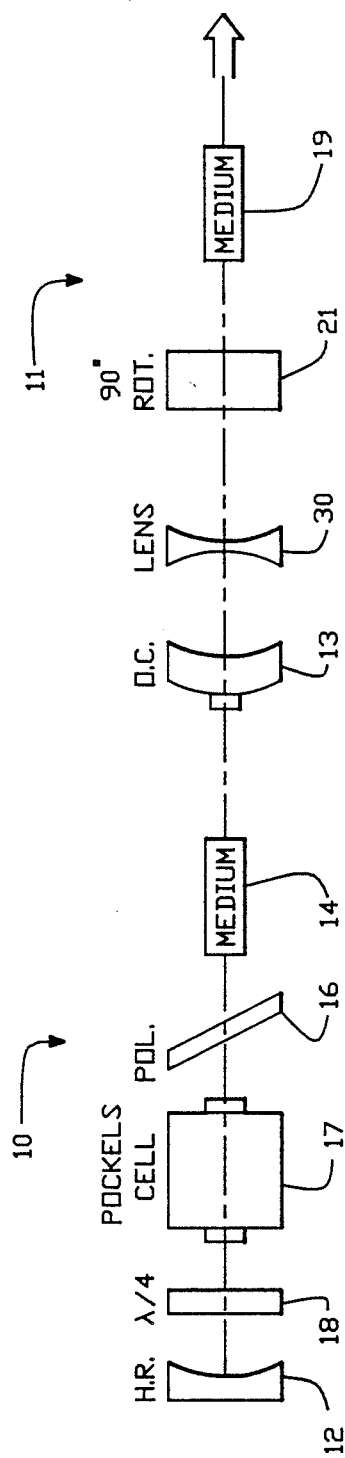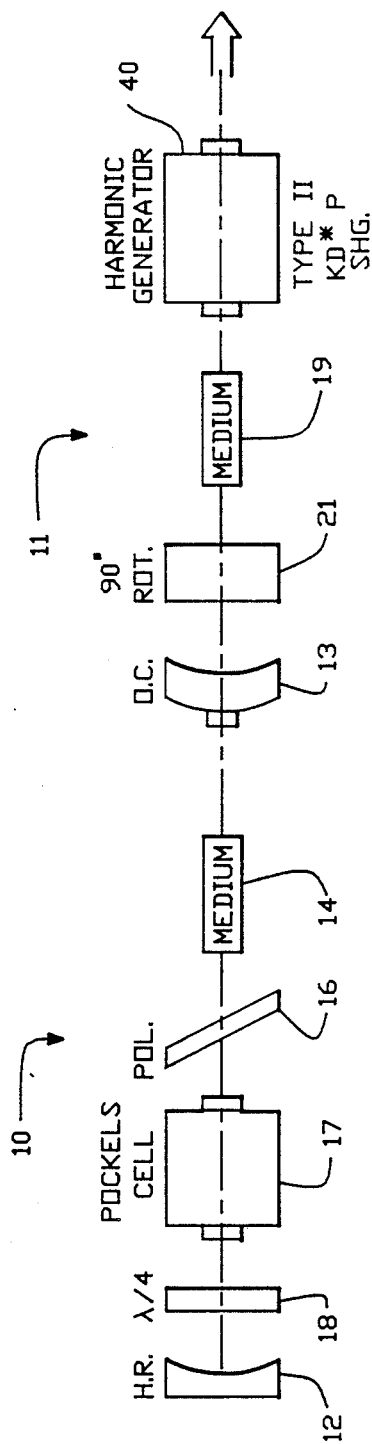

LASER OSCILLATOR/AMPLIFIER WITH COMPENSATION FOR STRESS BIREFRINGENCE

CONTINUING APPLICATION DATA

This is a continuation-in-part of U.S. Pat. No. 07/312,734, filed Feb. 17, 1989, now abandoned.

BACKGROUND OF THE INVENTION

1. Field of the Invention

The present invention relates to laser systems including an oscillator and an amplifier which exhibit thermally induced birefringence effects in the gain media. More particularly, the present invention provides a laser oscillator/amplifier system in which compensation for thermally induced birefringence in the gain medium of the oscillator is accomplished by offsetting thermally induced birefringence in the amplifier.

2. Description of Related Art

Linearly polarized laser beams are desirable for many laser related operations, such as harmonic generation, Q-switching, and external modulation of the beam. Further, for many applications it is desirable to have a uniform power density in a desired polarization.

The generation of a linearly polarized laser beam with a uniform power density with laser media that exhibit thermally induced stress birefringence under high thermal loading conditions has proved quite difficult. Therefore, in systems utilizing gain media like YAG, GSAG, GSGG, or YSGG, lasers are forced to emit linearly polarized beams by the introduction of a polarizer in the resonant cavity between the output coupler and the gain medium. The polarizer causes a significant decrease in output power and a degradation in the beam shape.

In the prior art, laser amplifiers have been designed to compensate for thermally induced birefringence by passing the beam to be amplified through the gain media with a first polarization, and then rotating the polarization by ninety degrees and passing the rotated beam back through the birefringent gain media. The depolarization effects of the first pass through the material are compensated by equal and opposite depolarization effects that take place during the second pass. Alternatively, rather than providing for two passes through a single gain medium, two matched gain media can be placed along the optical path with a ninety degree rotator in between. In this system, birefringence in the first gain medium is compensated by birefringence in the second gain medium. See Heritier et al., "Thermal Effects in High Power Q-Switched Lasers", SPIE OE-LASE Conference, Jan. 1988.

Likewise, a laser oscillator has been implemented, using two matching gain media within a oscillator cavity having a ninety degrees rotator in between. See Scott et al., "Birefringence Compensation and TEM00 Mode Enhancement in a Nd:YAG Laser", APPLIED PHYSICS LETTERS, Vol. 18, No. 1, Jan. 1, 1971, pages 3-4. See also, Koechner, SOLID STATE LASER ENGINEERING, Second Edition, Springer-Verlag, 1988, pages 361-367.

In systems requiring high power, it is desirable to amplify the output of the laser oscillator. These prior art systems would require birefringence compensation in both the oscillator leg and the amplifier leg in order to ensure a uniform power distribution and high power density in the desired polarization. Such systems result in exceedingly complex laser apparatus.

It is desirable therefore to implement an oscillator/amplifier system with birefringence compensation efficiently and at relatively low cost.

SUMMARY OF THE INVENTION

The present invention provides a laser oscillator/amplifier system in which thermally induced birefringence in the gain media of the oscillator is compensated by thermally induced birefringence in the gain media of the amplifier. The system produces a quality output beam efficiently and with uniform power density in the preferred polarization.

According to one aspect, the present invention is an apparatus for generating a laser beam comprising an oscillator cavity characterized by a high reflector at one end and an output coupler at the second end with an oscillator gain medium exhibiting thermally induced birefringence in between. An amplifier exhibiting thermally induced birefringence which matches the thermally induced birefringence in the oscillator gain medium is mounted to receive the output of the oscillator cavity. A ninety degree rotator is mounted between the oscillator gain medium and the amplifier so that compensation for thermally induced birefringence in the oscillator gain medium is compensated by the matching thermally induced birefringence in the amplifier. The ninety degree rotator may be mounted inside the oscillator cavity, that is, between the oscillator gain medium and the output coupler; or it may be mounted outside of the oscillator cavity, that is, between the output coupler and the amplifier.

According to another aspect of the present invention, the laser oscillator cavity includes a polarizer and a Q-switch between the oscillator gain medium and the high reflecting mirror.

According to yet another aspect of the present invention, a harmonic generator is mounted to receive the output of the amplifier and generate harmonics of the compensated beam.

According to yet another aspect of the present invention, the oscillator/amplifier includes a system for injection seeding.

Other aspects and advantages of the present invention can be determined upon review of the figures, detailed description and claims which follow.

BRIEF DESCRIPTION OF THE FIGURES

FIG. 1 is a schematic diagram of a laser oscillator/amplifier system according to the present invention with a rotator mounted outside of the oscillator cavity.

FIG. 2. is a schematic diagram of an alternative embodiment of the present invention with the rotator mounted inside the oscillator cavity.

FIG. 3 is a schematic diagram of a third alternative embodiment of the present invention with a negative meniscus lens mounted between the oscillator cavity and the amplifying gain medium.

FIG. 4 is a schematic diagram of a laser oscillator/amplifier system according to the present invention with a frequency doubler.

DETAILED DESCRIPTION

Figure 5:
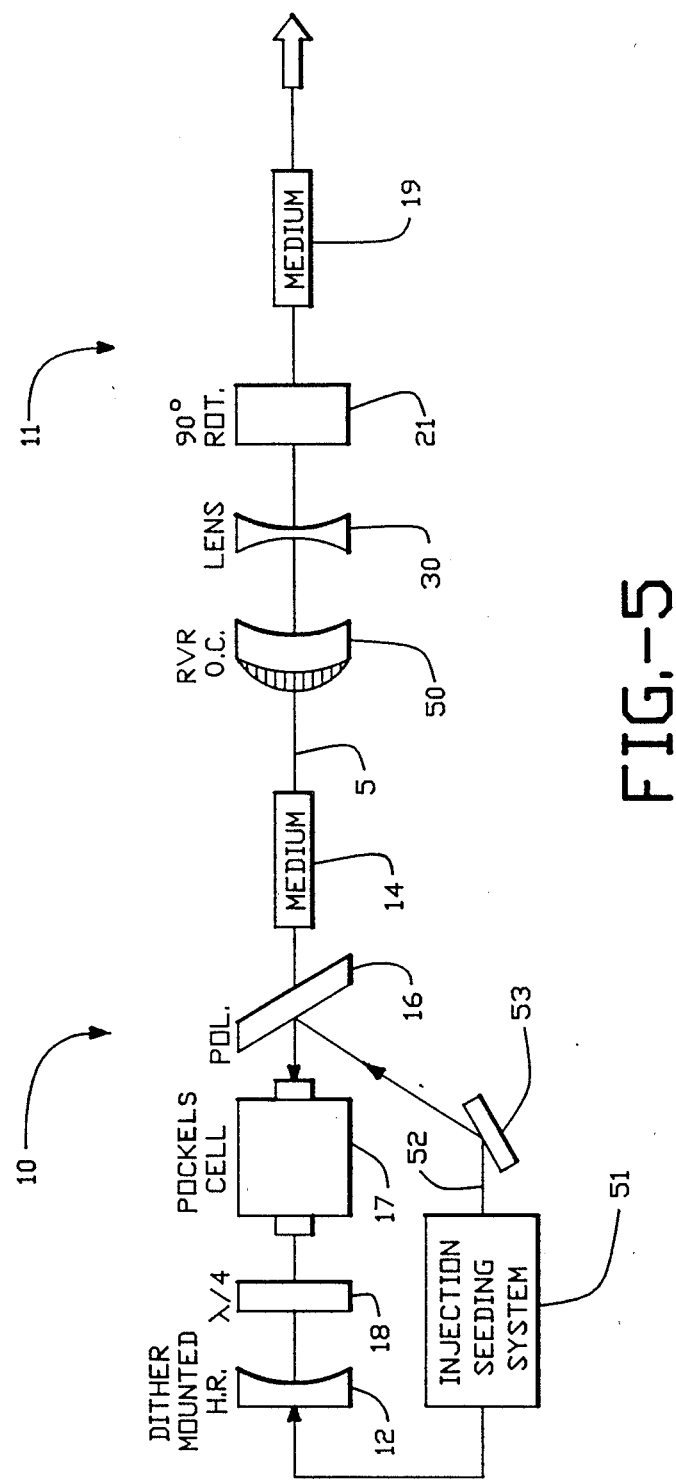
FIG. 5 is a schematic diagram of a laser oscillator/amplifier system according to the present invention with an injection seeding system.

A detailed description of preferred embodiments of the present invention is described with reference to the figures.

In FIG. 1 an oscillator/amplifier system according to the present invention is schematically illustrated. The system includes an oscillator 10 and an amplifier 11. The oscillator 10 is characterized by a resonant cavity defined by high reflecting mirror 12 and output coupler 13 which define an optical path 5 inside the resonant cavity. An oscillator gain medium 14, such as a rod of Nd:YAG, is mounted along the optical path 5. The gain medium 14 is pumped by an oscillator lamp 15 using techniques well known in the art.

A polarizer 16, Pockels cell 17, and ¼ waveplate 18 are mounted along the optical path between the gain medium 14 and the high reflecting mirror 12. The ¼ waveplate 18 and Pockels cell 17 are operated to form a Q-switch so that the oscillator 10 generates pulses of output along the optical path. The preferred system is a modified commercial Nd:YAG laser, models DCR-3 or DCR-4, available from SPECTRA-PHYSICS of Mountain View, California. The DCR-3 and DCR-4 include a second polarizer between the gain media 14 and the output coupler 13 which is removed as unnecessary for this application. Of course, the Q-switch could be replaced by mode lookers, or other optical switches as known in the art.

The gain medium 14 is characterized by thermally induced stress birefringence during conditions of high thermal loading. The effect of the thermally induced birefringence is exhibited in the beam generated in the oscillator 10.

The amplifier 11 includes a gain medium 19, such as a rod of Nd:YAG, mounted along the optical path of the output of the oscillator 10. The gain medium 19 in the amplifier is characterized by thermally induced stress birefringence. An amplifier lamp 20 pumps the amplifying medium 19 as known in the art.

Mounted along the optical path, between the output coupler and the amplifier is a ninety degree rotator 21.

A component of the beam within the oscillator 11 is transmitted by the output coupler through the ninety degree rotator 21 into the amplifying medium 19. The effect of the birefringence of the oscillator gain medium 14 is thus compensated for by a matching effect in the amplifying gain medium 19.

Matching of the thermally induced birefringence in the oscillator medium 14 with the thermally induced birefringence in the amplifying medium 19 is accomplished by selecting a gain medium 19 for the amplifier which is physically identical to, or similar to, the gain medium 14 for the oscillator, and pumping the amplifier medium 19 at a level which induces birefringence in the amplifying medium 19 that matches the effect of the birefringence in the transmitted component of the oscillator beam.

As one example of an implementation, the high reflecting mirror 12 is a seven meter concave high reflecting mirror. The output coupler 13 is a dot mirror with a 60 cm convex lens surface 21 and a 60 cm concave lens surface 22. The dot mirror can be replaced by a radially variable reflectivity mirror, if desired. The high reflecting mirror 12 and output coupler 13 are mounted approximately 80 cm apart. The gain medium 14 is an Nd:YAG rod 8.5 mm in diameter and 62 mm long.

The amplifier gain medium 19 is a 9.5 mm diameter Nd:YAG rod, 62 mm long. With the oscillator lamp 15 pumped at 180 lamp joules and the amplifier lamp 20 pumped at 150 lamp joules, and operated in Q-switch mode, more than 97% of the output power from the amplifier stage 11 remains linearly polarized with a smooth output distribution. Removal of the ninety degree rotator from this system, by contrast, reduces the fraction of energy in the desired polarization to less than 65%.

In Nd:YAG rods, under conditions of uniform thermal loading, the thermally induced stress birefringence is cylindrically symmetrical, as described in the Heritier, et al. article, cited above.

The amplifying medium 14 is nominally .6 to .8% Nd. The amplifier medium 19 is doped with .8 to 1.1% Nd. The ninety degree rotator 21 may be implemented by a variety of optic devices as known in the art. For instance, a quartz rotator could be used.

The curvature of the high reflector 12 and the output coupler 13 are selected to provide a roughly collimated output of the amplifier.

FIG. 2 is a schematic diagram of an alternative implementation in which the rotator is mounted inside the oscillator cavity.

In FIG. 2, the lamps 15 and 20 are not illustrated to simplify the figure. Reference numbers used in FIG. 1 are used likewise in FIG. 2 for equivalent components. This embodiment can be implemented by modifying a standard DCR-4 by removing the second polarizer normally positioned between the medium 14 and the output coupler 13 and replacing it with a ninety degree rotator 21. It is found that the order of the rotator and the output coupler in the oscillator/amplifier system according to the present invention does not have a substantial effect on the quality of the output beam nor on its energy. Design considerations for placing the ninety degree rotator inside the oscillator 10 include the differences in power density inside the oscillator cavity and outside the oscillator cavity. Also, space limitations created by a particular implementation of the oscillator cavity and the amplifier 11 may dictate other positions of the rotator.

FIG. 3 illustrates yet an alternative embodiment of the oscillator/amplifier system according to the present invention. Again, components in FIG. 3 that are equivalent to components in FIG. 1 are given like reference numbers.

The system of FIG. 3 is equivalent to the system of FIG. 1 with the addition of a negative meniscus lens 30 between the output coupler 13 and the ninety degree rotator 21. The rear mirror 12 is selected to more accurately collimate the output of the oscillator. The meniscus lens 30 compensates for the thermal lensing in the amplifier, and acts to improve the output of the system for applications requiring highly collimated output beams. For instance, in the system of FIG. 1 with the addition of a −3.5 meter f.1. (negative) meniscus lens, a substantial improvement in the output beam was achieved.

As mentioned above, a high power collimated output beam with a uniform power distribution and a preferred polarization is desired for many laser related applications. One application illustrated in FIG. 4 is harmonic generation. Accordingly, FIG. 4 illustrates an oscillator/amplifier according to the embodiment of FIG. 1 mounted with a harmonic generator 40. The harmonic generator 40 is a type II, KD*P second harmonic generator used with the Nd:YAG gain media to frequency double the output. Tests were done comparing generation of the second harmonic between the DCR-4 embodiment using a second polarizer inside the oscillator cavity and the embodiment of FIG. 4. It is found that, at 30 Hertz pulse rate with the oscillator medium 14 and the amplifier medium 19 pumped at 70 lamp joules per pulse, the energy output of the harmonic generator increased from approximately 200 millijoules per pulse in a standard DCR-4 to approximately 500 millijoules per pulse in the embodiment of FIG. 4. Furthermore, the beam quality is greatly enhanced.

Therefore, the uniform power density in the preferred polarization created by the oscillator/amplifier system according to the present invention is reflected by a substantial gain in efficiency of the second harmonic generator 40. The efficiency could be even more greatly improved by the addition of lenses for collimating the beam, such as the negative meniscus lens 30 of FIG. 3.

FIG. 5 illustrates utilization of the oscillator/amplifier system according to the present invention in an injection seeded system. The injection seeded oscillator/amplifier includes all the same components as shown in FIG. 3 with some additions. Further, the output coupler is explicitly shown to be a radially variable reflectivity output coupler 50. The oscillator 10 is injection seeded using the injection seeding system 51 which consists of a small CW-YAG laser with a milliwatt or two of power at 1064 nm and a Faraday isolator preventing feedback from the oscillator 10. The system generates the seed beam along path 52 and is reflected by reflector 53 into the polarizer 16. Polarizer 16 directs the seeding beam through the Pockels cell 17 to high reflector 12 and back through the medium 14. This induces a pure longitudinal mode in the oscillator 10.

The injection seeding system 51 further includes a dither control system for the high reflector 12. As known in the art, the high reflector 12 may be dither mounted and its position controlled to match the longitudinal mode of the oscillator 10 with the frequency of the seeding beam 52.

In prior art solid state systems, employing injection seeding, a problem with spatial hole burning arises. To prevent spatial hole burning in the oscillator medium, quarter waveplates are typically mounted at either end of the medium. This induces circular polarization inside the medium so that the standing wave pattern inducing spatial hole burning is eliminated. See eg., Koechner, SOLID-STATE LASER ENGINEERING, 2nd Edition, Springer-Verlag, 1988, pp. 223-224.

Utilization of the quarter waveplates does not impact the design of resonators according to the present invention. Accordingly, they may be inserted if desired. However, it is found that they are unnecessary. It is believed that they are unnecessary because the medium 14 is operated with considerable stress induced birefringence which induces sufficient ellipticity in the beam travelling through the medium 14, that spatial hole burning does not reach significant levels.

In the event that quarter waveplates are used to prevent spatial hole burning in medium 14, such as may be required at lower pumping powers, then matching quarter waveplates should be placed around the amplifying medium 19.

In sum, the present invention provides an oscillator/amplifier laser in which compensation for thermally induced birefringence in the gain medium of the oscillator is accomplished by offsetting thermally induced birefringence in the gain medium of the amplifier. Utilizing the present invention, it is found that no intracavity compensation is required for thermally induced birefringence in the oscillator, and no compensation outside the oscillator cavity is required for thermally induced birefringence in the amplifier gain medium.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for generating a laser beam, comprising:
   means for reflecting incident light along an optical path;
   an oscillator gain medium characterized by a distribution of stress birefringence, mounted along the optical path for generating an oscillator beam along the optical path, the oscillator beam having a polarization distribution affected by the stress birefringence in the oscillator gain medium;
   an output coupler mounted along the optical path so that the means for reflecting, the oscillator gain medium and the output coupler form a laser oscillator transmitting a component of the oscillator beam;
   amplifying means, mounted along the optical path so that the output coupler is between the oscillator gain medium and the amplifying means, for amplifying light on the optical path to generate the laser beam, the amplifying means characterized by a distribution of stress birefringence; and
   means, mounted along the optical path between the oscillator gain medium and the amplifying means, for rotating the polarization distribution in at least the component of the oscillator beam so that compensation for the effect of the stress birefringence in the oscillator gain medium is accomplished by the stress birefringence in the amplifying means.

2. The apparatus of claim 1, wherein the means for rotating is mounted between the oscillator gain medium and the output coupler.

3. The apparatus of claim 1, wherein the means for rotating is mounted between the output coupler and the amplifying means.

4. The apparatus of claim 1, further including:
   switching means, mounted on the optical path between the means for reflecting and the oscillator gain medium, for switching the laser oscillator to generate pulses of the oscillator beam along the optical path.

5. The apparatus of claim 1, wherein the oscillator gain medium comprises Nd:YAG.

6. The apparatus of claim 1, wherein the amplifying means comprises Nd:YAG.

7. The apparatus of claim 5, wherein the amplifying means comprises Nd:YAG.

8. The apparatus of claim 1, wherein the stress birefringence in the oscillator gain medium is thermally induced.

9. The apparatus of claim 1, wherein the distribution of stress birefringence in the oscillator gain medium is cylindrically symmetrical.

10. The apparatus of claim 1, further including:
means, mounted along the optical path to receive the laser beam generated by the amplifying means, for generating a harmonic of the laser beam.

11. The apparatus of claim 1, further including:
means, mounted between the output coupler and the amplifying means, for compensating for thermal lensing in the amplifying means.

12. The apparatus of claim 1, further including:
means for supplying an injection-seeding beam through the oscillator gain medium.

13. An apparatus for generating a laser beam, comprising:
means for reflecting incident light along an optical path;
an oscillator gain medium characterized by a distribution of stress birefringence, mounted along the optical path for generating an oscillator beam along the optical path, the oscillator beam having a polarization distribution affected by the stress birefringence in the oscillator gain medium;
switching means, mounted on the optical path between the means for reflecting and the oscillator gain medium, for switching the laser oscillator to generate pulses of the oscillator beam along the optical path;
polarizing means, mounted along the optical path between the oscillator gain medium and the switching means, for polarizing the oscillator beam;
an output coupler mounted along the optical path so that the means for reflecting, the oscillator gain medium and the output coupler from a laser oscillator transmitting a component of the oscillator beam;
amplifying means, mounted along the optical path so that the output coupler is between the oscillator gain medium and the amplifying means, for amplifying light on the optical path to generate the laser beam, the amplifying means characterized by a distribution of stress birefringence; and
means, mounted along the optical path between the oscillator gain medium and the amplifying means, for rotating the polarization distribution in at least the component of the oscillator beam by essentially ninety degrees so that compensation for the effect of the stress birefringence in the oscillator gain medium is accomplished by the stress birefringence of the amplifying means.

14. The apparatus of claim 13, further including:
means, mounted between the output coupler and the amplifying means, for compensating for thermal lensing in the amplifier means.

15. The apparatus of claim 13, wherein the means for rotating is mounted between the oscillator gain medium and the output coupler.

16. The apparatus of claim 13, wherein the means for rotating is mounted between the output coupler and the amplifying means.

17. The apparatus of claim 13, wherein the oscillator gain medium comprises Nd:YAG.

18. The apparatus of claim 13, wherein the amplifying means comprises Nd:YAG.

19. The apparatus of claim 13, wherein the amplifying means comprises Nd:YAG.

20. The apparatus of claim 13, wherein the stress birefringence in the oscillator gain medium is thermally induced.

21. The apparatus of claim 13, wherein the distribution of stress birefringence in the oscillator gain medium is cylindrically symmetrical.

22. The apparatus of claim 13, further including:
means, mounted along the optical path to receive the laser beam generated by the amplifying means, for generating a harmonic of the laser beam.

23. The apparatus of claim 13, further including:
means for supplying an injection seeding beam incident on the polarizing means so that it is reflected along the optical path towards the means for reflecting incident light, and back through the oscillator gain medium.

* * * * *